United States Patent [19]

Keate

[11] Patent Number: 4,870,660
[45] Date of Patent: Sep. 26, 1989

[54] VARIABLE FREQUENCY RATE RECEIVER

[75] Inventor: Christopher R. Keate, Salt Lake City, Utah

[73] Assignee: Unisys Corporation, Blue Bell, Pa.

[21] Appl. No.: 138,183

[22] Filed: Dec. 28, 1987

[51] Int. Cl.$^4$ ............................................. H03D 3/00
[52] U.S. Cl. ..................................... 375/88; 375/120; 331/14
[58] Field of Search .................... 375/81, 88, 120, 115; 331/14; 329/50, 122, 124

[56] References Cited

U.S. PATENT DOCUMENTS 4,600,889  7/1986  Rugen ................................... 375/81
4,614,910  9/1986  Ishigaki et al. ..................... 375/120
4,713,630 12/1987  Matthews ............................. 375/120

Primary Examiner—Robert L. Griffin
Assistant Examiner—Michael Ricci
Attorney, Agent, or Firm—John B. Sowell; Robert S. Bramson; Mark T. Starr

[57] ABSTRACT

A variable data rate receiver is provided which employs a novel phase locked loop (PLL) of the type employing a data detection loop and a tracking loop. The data detection loop is initially not coupled to the input of the voltage controlled oscillator in the tracking loop of the PLL, but is separated by an electronic switch. A phase lock detection circuit is provided which is coupled to the data detection loop and to the tracking loop for detecting the difference in the voltage error signals in the data detection loop and the tracking loop. When this error signal indicates that the tracking loop is locked on to the carrier signal the electronic switch is closed completing the phase locked loop circuit after lock on of the carrier is achieved.

17 Claims, 4 Drawing Sheets

VARIABLE FREQUENCY RATE RECEIVER

BACKGROUND OF THE INVENTION

1. Field of the Invention

This invention relates to phase shift key (PSK) receivers. More particularly, the present invention relates to PSK receivers capable of being easily changed or programmed to different data frequencies without redesign or basic hardware modifications. Further, the present invention achieves acquisition of the data stream faster than prior art systems.

2. Description of the Prior Art

Prior art data acquisition systems or receivers, employed phase lock loops to acquire and lock onto the data stream. The acquisition time of such systems is a mathematical function of doppler shift divided by data rate. The larger this ratio becomes the more difficult it is to lock on to the carrier signal.

Prior art data acquisition systems employed frequency multiplication in the recover loop as will be explained in detailed examples provided hereinafter. As a result of performing multiplication in the recovery loops, the doppler shift ratio is effectively increased. In the case of Binary Phase Shift Keying (BPSK) this ratio is doubled or increased by a factor of two. In the case of Quadrature Phase Shift Keying (QPSK) the ratio is increased by a factor of four, thus making it more difficult and more timely to achieve acquisition of the data stream. In the prior art data acquisition systems it was necessary to change the design of the acquisition loop to achieve a change in the data rate. It would be extremely desirable to provide a variable frequency data rate receiver. Further it would be extremely desirable to provide a data acquisition loop in the variable rate receiver which does not increase the acquisition time due to multiplication of the doppler shift.

SUMMARY OF THE INVENTION

It is the principal object of the present invention to provide a phase shift key (PSK) receiver capable of receiving a wide range of data rate frequencies.

It is another principal object of the present invention to provide a novel variable rate PSK receiver having a novel lock detection circuit for locking onto a burst of carrier tone frequency preceding an input data stream.

It is another principal object of the present invention to provide a high frequency PSK variable rate receiver.

It is another object of the present invention to provide a variable rate PSK receiver having lower modulation loss in the data detection channel circuit.

It is another object of the present invention to provide a data aided loop receiver which is operable without multiplying or doubling the IF frequency as a prerequisite to tracking or locking on to the data carrier.

It is the general object of the present invention to provide a PSK variable rate receiver operable without changing IF filters over a broad range of data rates.

It is another general object of the present invention to provide a PSK variable rate receiver that achieves faster acquisition time.

It is another general object of the present invention to provide a variable rate receiver with an automatic gain control (AGC) which does not require alteration or redesign when changing the data rates.

According to these and other objects of the present invention there is provided a phase lock loop comprising a data detection loop and a tracking loop. A novel phase lock detection circuit is provided which is coupled to the data detection loop and the tracking loop to provide an output signal indicating that the tracking loop is locked onto the carrier signal and there is further provided an electronic switch between the data detection loop and the tracking loop which is operably closed by the signal from the phase lock detection circuit to operably connect the phase lock loop to the input data stream.

DESCRIPTION OF THE PREFERRED EMBODIMENT

Figure 1:
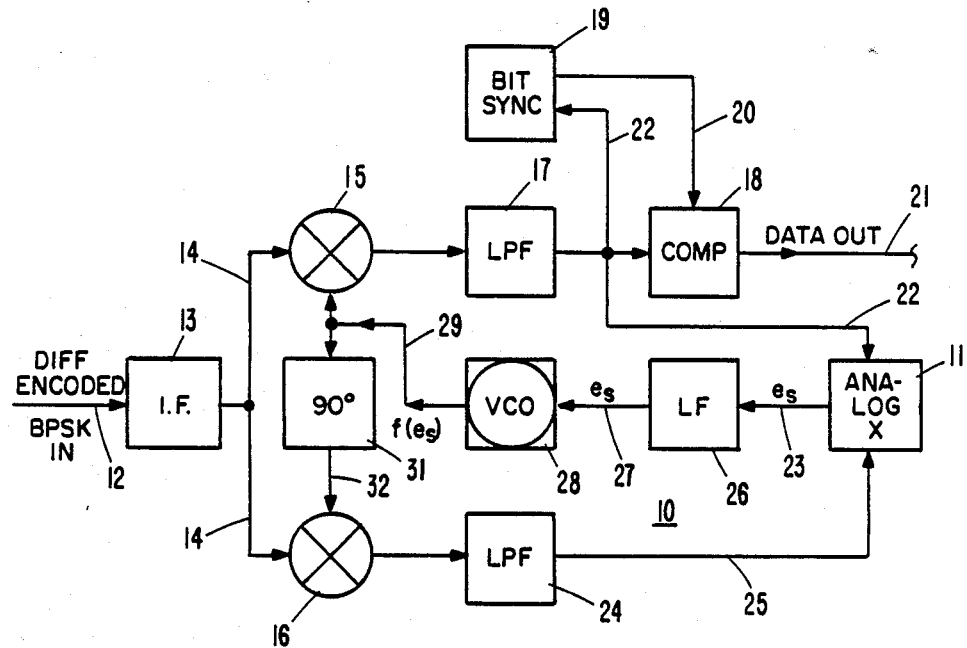
FIG. 1 is a block diagram of a prior art phase lock loop employing a low speed analog multiplier.

Refer now to FIG. 1 showing a block diagram of a prior art phase lock loop. The phase lock loop 10 comprising a low speed analog multiplier 11. The input signal on line 12 is preferably a differentially encoded binary phase shift key signal applied to the IF filter 13 to produce an output signal on line 14 which is a filtered input signal. The signal on line 14 is applied to a pair of mixers 15 and 16. The mixer 15 in the data detection loop is applied to a low pass filter 17 and the output of the low pass filter is applied to a comparator 18 to produce the data output signal on line 21 as is well known in the art. A bit synchronizing circuit 19 receives a signal from the output of the low pass filter 17 on line 22 and produces an output signal on line 20 which is applied to the comparator 18, thus, synchronizing the input data stream signal. The output of low pass filter 17 on line 22 is applied to the analog multiplier 11 to produce an error signal on line 23. The output of mixer 16 is applied to low pass filter 24 to produce a filtered error component signal on line 25 which is applied to the analog multiplier 11 to produce the aforementioned error signal on line 23. The error signal on line 23 is applied to the loop filter 26 to produce an analog voltage error signal on line 27 which is applied to the voltage controlled oscillator (VCO) 28 which in turn produces an estimate of the carrier frequency and phase as a voltage signal on line 29 that is applied to the mixer 15 to complete the data detection loop. Line 29 is also coupled to a 90 degrees phase shifter 31 to produce a quadrature or phase-shifted signal on line 32 which is applied to the mixer 16 to complete the tracking loop of the phase lock loop 10.

It will be noted that the frequency of the signal on line 22 before locking on has been achieved contains the beat note times the input data and that the frequency of the signal on line 25 contains the beat note times the data rate shifted ninety degrees compared to the signal on line 22, thus, the output signal on line 23 is double the beat note which is on lines 22 and 25 with the data removed. The penalty for removing the data is to double the beat note frequency on line 23. Phase lock loops of the type shown in FIG. 1 employ low speed analog multipliers are restricted to approximately 25 megahertz employing present technology.

Figure 2:
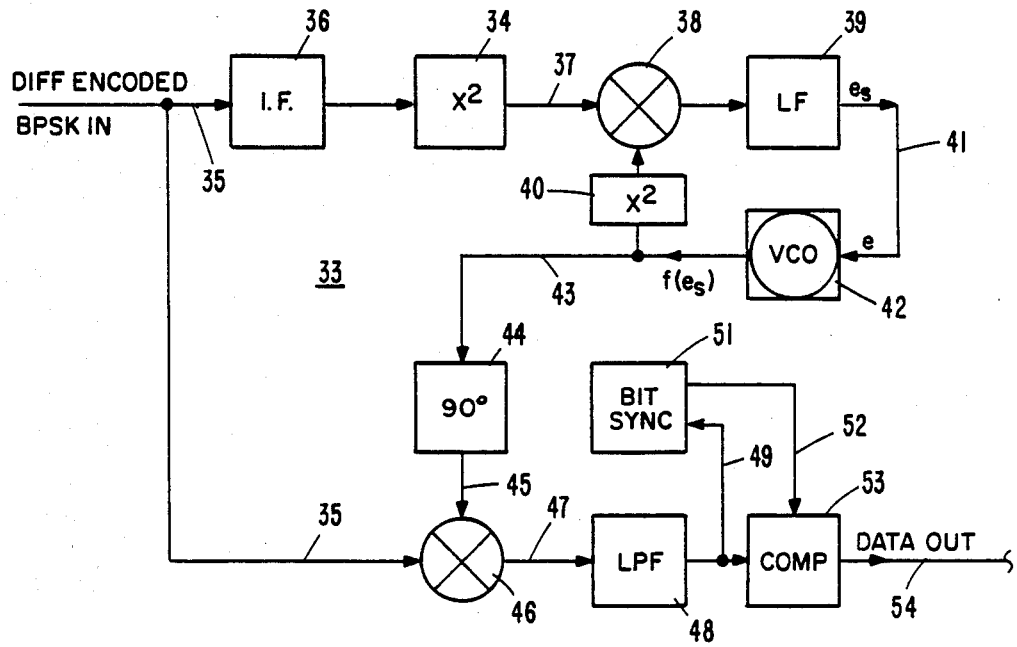
FIG. 2 is a block diagram of a prior art phase lock loop employing a pair of mixers and a frequency doubler.

Refer now to FIG. 2 showing a different type prior art phase lock loop 33 of the type which employs a frequency doubler 34. The input signal on line 35 is preferably a differentially encoded binary phase shift key which is applied to the IF filter 36 and the output filtered signal is applied to the frequency doubler 34 to produce a signal on line 37 which is at twice the carrier frequency and has the data removed. The signal on line 37 is applied to a mixer 38 which has its output applied to loop filter 39 to produce an error signal on line 41 which is applied to a voltage controlled oscillator 42 preferably operated at the carrier frequency. The output of voltage controlled oscillator on line 43 is applied to a frequency doubler 40 whose output is applied to mixer 38. The output of voltage controller oscillator 42 on line 43 is also applied to 90 degree phase shifter 44 to produce a quadrature phase shifted signal on the line 45 which is applied to mixer 46 along with the input signal on line 35 to produce an output signal on line 47 which is applied to the low pass filter 48. The output of low pass filter 48 on line 49 is applied to the bit synchronizer 51 and the output of the bit synchronizer 51 on line 52 is applied to a comparator 53 to produce the data output on line 54. The aforementioned frequency doubler 34 has doubled the beat frequency of the incoming signal creating a signal which is more difficult to lock onto in the tracking loop because of the increase of the beat frequency. This results in an increase in the acquisition time of the incoming signal.

Figure 3:
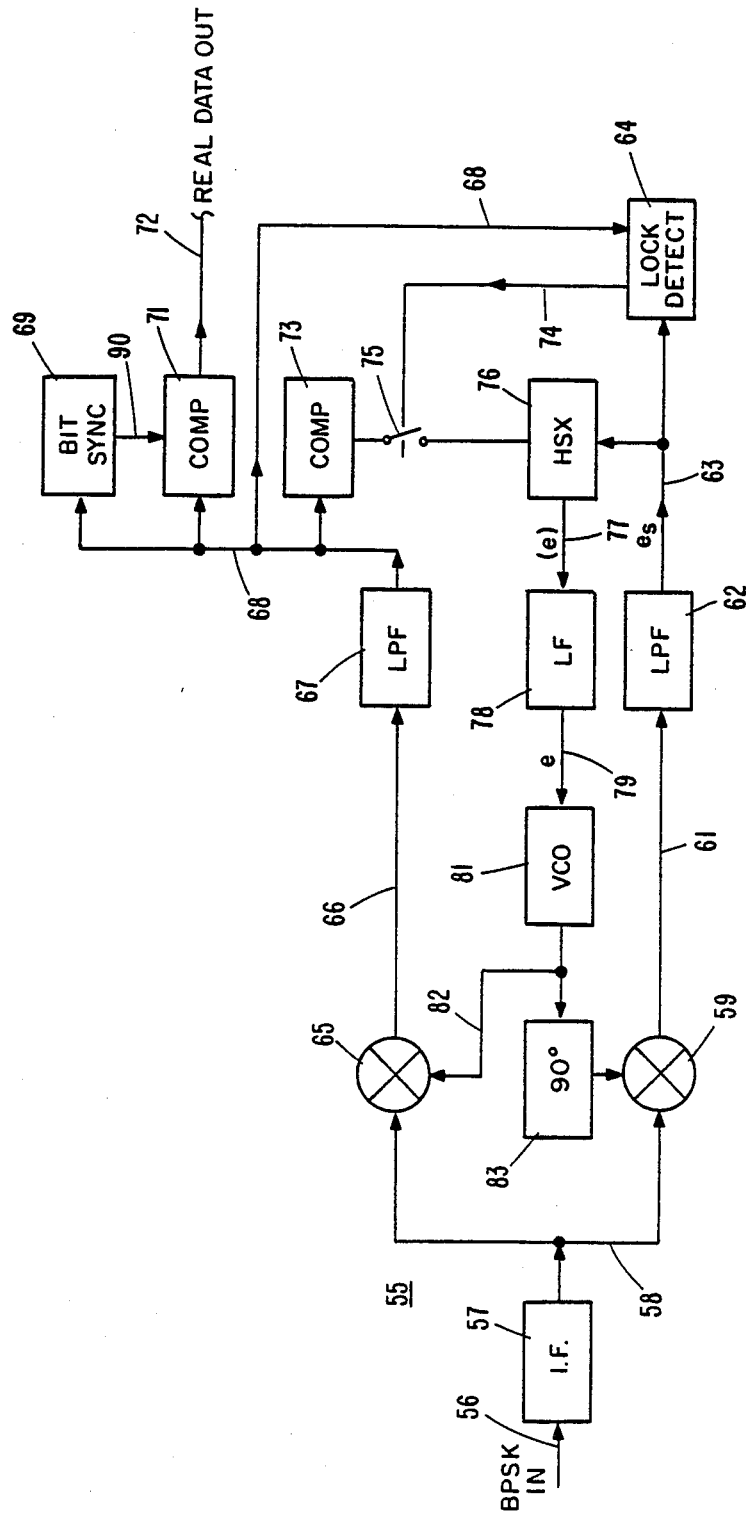
FIG. 3 is a block diagram of the present invention basic phase lock loop variable rate receiver employing a high-speed multiplier.

Refer now to FIG. 3 showing a block diagram of the present invention phase lock loop 55. The preferred embodiment shown in FIG. 3 may be employed in a fixed or single rate burst mode or as will be explained hereinafter may be employed in a variable rate mode by changing the frequency of the bit synchronizer 69 over a broad range. When the range of frequencies needs to be extended more extensively, the low pass filters 67, 62 in the data loop and the tracking loop can be switched or changed to expand the variable rate. A further feature of the present invention is that it will accept either binary phase shift key unencoded data signals on line 56 or when operating in the preferred mode will also accept differentially encoded binary mode shift code signals after locking on to the burst of carrier tone signals which precede the data stream. The signal on line 56 for purposes of this explanation will first be explained as a carrier tone signal which is applied to the IF filter. 57 whose output on line 58 is applied to mixer 59. The output of mixer 59 on line 61 is applied to a low pass filter 62 which preferably has a band pass as wide as the data frequency. The filtered output on line 63 is applied to the novel phase lock detection means shown as lock detector 64. The filtered data signal on line 58 is also applied to mixer 65 in the data detection loop. The output from mixer 65 on line 66 is applied to low pass filter 67 which has the same band pass as low pass filter 62. The filtered output on line 68 is applied to the lock detector 64 as well as to bit synchronizer 69, comparator 71 (which produces the real data output on line 72) and to comparator 73. Comparators 71 and 73 produce plus and minus one outputs in response to transitions around zero occurring on line 68. The lock detector 64 is looking for a high voltage on line 68 and a low voltage on line 63 indicative of a condition in which the tracking loop is locked on to the carrier signal. In the preferred embodiment shown in FIG. 3, a burst of carrier tone signal is provided which precedes the data stream and is predetermined to be long enough to achieve lock detection. After locking onto the carrier signal, a lock signal is produced on line 74 which closes switch 75 which connects the data detection loop to the tracking loop and completes the operation of the phase locked loop 55. The tracking error signal on line 63 is applied to a high-speed multiplier 76 which produces an error signal output on line 77 that is filtered in filter 78 and provides a filtered error signal on line 79 which is applied to the voltage controlled oscillator 81. The output of the voltage control oscillator on line 82 is applied to mixer 65 and via 90 degree phase shifter 83 to mixer 59, thus, completing the tracking loop. It will be understood that in the preferred mode of operation, the switch 75 is initially opened and the carrier tone signal is received on line 56 causing the lock detector 64 to close switch 75 prior to the receipt of data stream transmission on line 56. The advantage to the variable rate receiver and phase lock loop 55 shown in FIG. 3 is that the tracking loop locks on in phase so that the signal on line 56 does not have to be differentially encoded. However, if a differentially encoded BPSK signal is applied to line 56 when switch 57 has been closed the system is operable and is also in phase. It will be noted that during the short acquisition period when the carrier tone signal is present in the tracking loop that the beat note frequency is not multiplied in any way, thus, decreasing the acquisition time. Once the lock detector 64 closes switch 75 the receiver will now track a data modulated carrier on line 56 at the lower frequency.

Filters 62 and 67 are designed to embrace the complete range of the data frequency, thus, the doppler shift may be as large as the data rate and the system will still pull in and lock onto the carrier signal. Further, the ability of the system to pull in signals within the complete range of the data frequency increases the pull in range because the prior art systems are incapable of pulling in signals within the range of data frequencies. The phase locked loop described in FIG. 3 employs a high-speed multiplier 76. The frequency of the phase locked loop may be extended to approximately 2 gigahertz by providing a high-speed multiplier capable of operating at data rates approximately 2 gigabits. The present system is operable with an analog multiplier at lower frequencies but is preferably operable with a high-speed multiplier 76 of the type shown and described in our copending application Ser. No. 07/138,184 filed Dec. 28, 1987 entitled A High speed Analog Multiplier Absolute Value Detector which may be used as a high-speed chopper multiplier.

Figure 4:
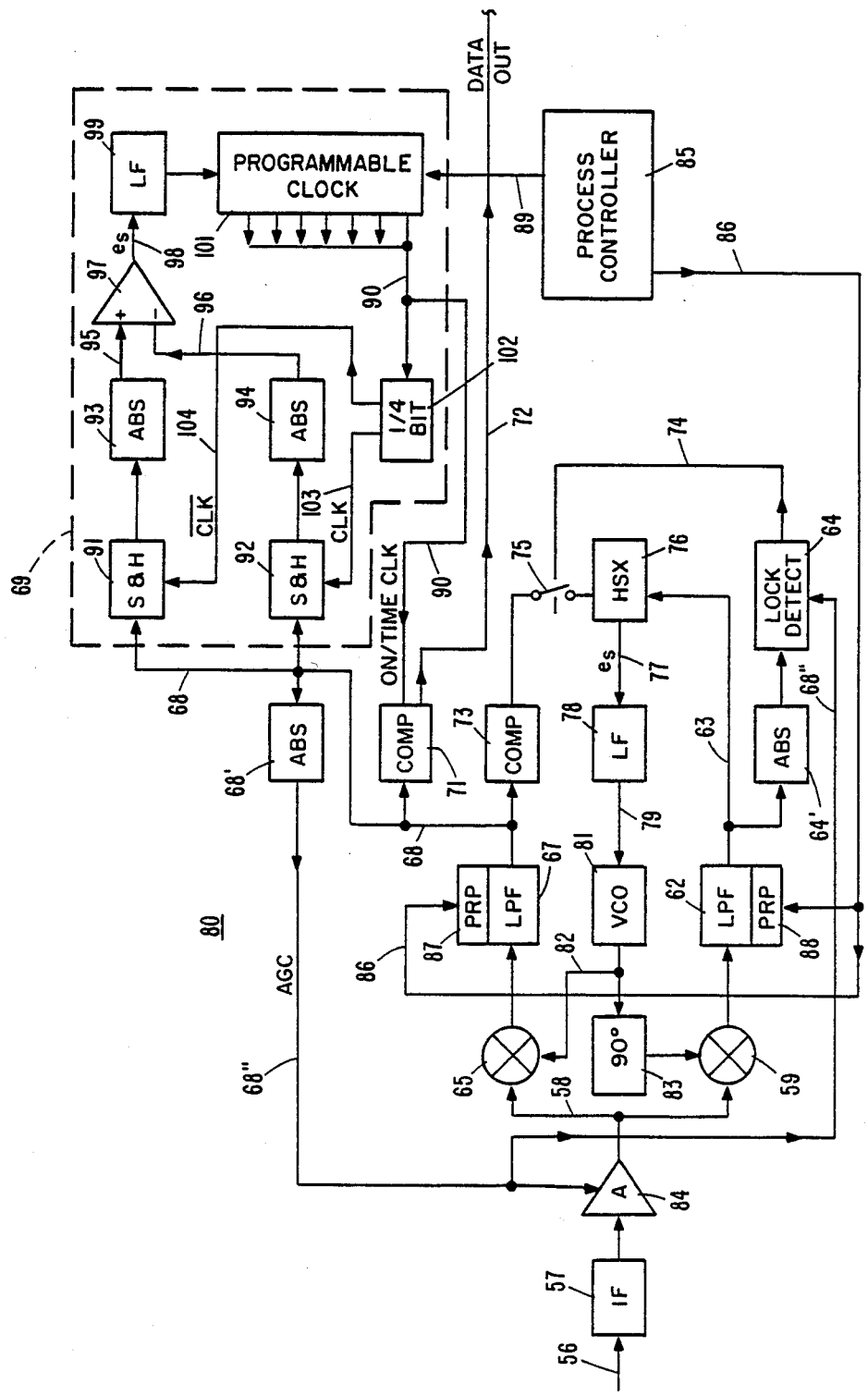
FIG. 4 is a more detailed block diagram of the present invention showing a processor controller for modifying or adjusting the variable date rate.

Refer now to FIG. 4 which is a more detailed block diagram of the present invention showing a processor controller 85 for implementing a variable data rate receiver 80. The elements and mode of operation of the receiver 80 shown in FIG. 4 are similar to the receiver shown in FIG. 3 and the elements which are identical to those shown in FIG. 3 have been employed in the numbering system of FIG. 4. For example, the input stream on line 56 is applied to an IF filter 57 which is the same as FIG. 3. However, the output of the IF filter 57 is applied to an amplifier 84 which is employed for operation of the AGC circuit which will be explained hereinafter. The filtered data stream on line 58 is again applied to mixers 65 and 59 as explained hereinbefore. The data loop which results in providing a demodulated data signal on line 68 employs the same components having the same numbers as FIG. 3. The tracking loop which employs the high-speed multiplier 76 is also numbered the same as FIG. 3. It will be noted that the output of low pass filter 62 on line 63 is applied to an absolute value detector 64' which was previously located inside of lock detector 64. Similarly the absolute value detector 68' in the AGC line 68" was previously inside of lock detector 64 but is now shown having its output signal coupled to amplifier 84 and the same signal on line 68" is coupled to the lock detector 64. The preferred embodiment variable data rate receiver employs a process controller 85 having a control line 86 connected to a programmable resister pack 87 and a second programmable resistor pack 88 connected to the low pass filters 67 and 62 respectively to permit changing the filter bandwidths. It is understood that the programmable resistor packs 87 and 88 may comprise a plurality of analog resistors and components that are switch selectable hardware switched to provide the appropriate filter bandwidth desired. In order to further implement the variable data rate receiver, a control line 89 is shown applied to the bit synchronizer 69 (shown inside of the phantom line block). Also shown as an output of the bit synchronizer is an on-time clock on line 90, also shown as an input to comparator 71. It will be noted that the automatic gain control line 68" applied to IF amplifier 84 serves the purpose of maintaining a constant power level signal on line 58 to mixers 65 and 59 so that the loop design parameters of the low pass filters may be maintained constant even though there may be a variation of power on the signal input line 56.

The bit synchronizer 69 may be implemented as an early-and -late gate bit synchronizer as shown. Other methods of achieving bit synchronizers such as delay and multiply and/or employing a digital transition tracker could also be employed with the same results achieved herein but were found to be more complex to design and more expensive to implement.

The recovered data signal on line 68 is shown being applied to two sample and hold (S & H) circuits 91 and 92 having their respective outputs applied to absolute value detectors (ABS) 93 and 94. The output of the absolute value detectors 93, 94 on lines 95 and 96 are applied to a differential amplifier 97 to produce an error voltage signal on line 98 which is applied to a loop filter 99. The output of the loop filter 99 is applied to a programmable clock 101 which is programmed by the control signal on line 89 from processor controller 85. The programmable clock 101 may be implemented by employing a plurality of switch selectable clocks at predetermined desired frequencies or may be implemented as a digital synthesize clock to produce an on-time clock on line 90 which is applied to the comparator 71, also shown in FIG. 3. The on-time clock is also applied to the one quarter bit delay 102 having two outputs, one of which is the leading edge of the clock shown as CLK and the other being the trailing edge of the clock signal shown as CLK on lines 103 and 104 respectively. The clock signals on lines 103 and 104 are applied to the sample and hold circuits 91 and 92 which synchronize the incoming data on line 68 as explained hereinbefore. In order to develop an error voltage from the output signals of the two sample and hold circuits 91, 92, absolute value detectors 93 and 94 are employed. The absolute value detectors shown as 64', 68', 93 and 94 may be implemented as ring diodes or other equivalent absolute value detectors. However, in the preferred embodiment shown, the absolute value detectors may be implemented employing the preferred embodiment structures set forth in our co-pending application Ser. No. 07/138,184 Filed Dec. 28, 1987 entitled Absolute Value Detector and also used as a highspeed chopper in the high-speed multiplier 76.

Having explained the preferred embodiment variable data rate receiver employing analog devices it will be understood that the analog output signals on lines 68 and 63 from the low pass filters 62, 67 may be converted to digital signals using A to D converters and clocking the A to D converters with the on-time clock. Thus the high-speed multiplier 76 and the bit synchronizer 69 may easily be implemented in digital element format. The analog filters may be converted from digital to analog or analog to digital to complete the conversion of FIG. 4 embodiment to a digital system controlled by digital processor 85.

Figure 5:
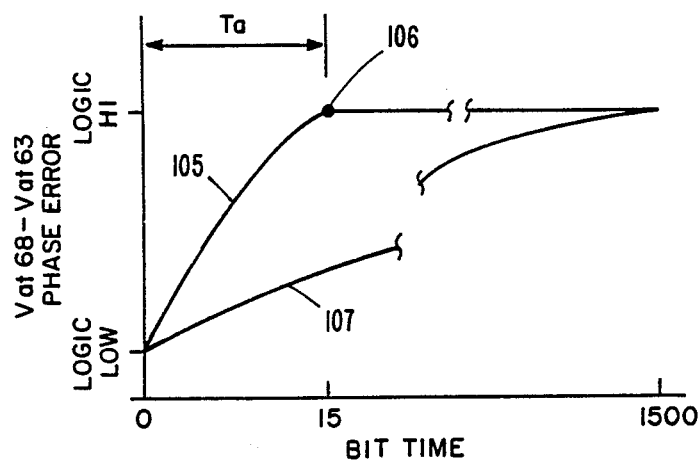
FIG. 5 is a waveform diagram illustrating the reduction in acquisition time achieved by the present invention.

Refer now to the waveforms in FIG. 5 illustrating the reduction of acquisition time accomplished when employing the present invention. The abscissa of the waveform diagram represents the phase error or the voltage on line 68 minus the voltage on line 63 being detected by the lock detector 64. Thus the initial voltage difference at lock detector 64 senses the logic low and as the phase error difference diminishes the transient response curve 105 increases until it reaches a logic high at point 106. The time $T_A$ represents the time of acquisition in bits employing the present embodiment invention which has been determined to be less than 50 bit times and is insensitive to the data rate. At point 106 the switch 75 is closed by the lock detector 64. The lock detector 64 continues to sense the logic high and holds the switch 75 engaged. If the phase error signal faded away or the tracking loop lost lock on, the logic high would no longer be produced at the lock detector 64 and the switch 75 would be automatically opened. Curve 107 is superimposed on FIG. 5 to show the acquisition time in bits which would be necessary employing the phase lock loops shown in FIGS. 1 and 2 of the prior art. Since the two prior art figures both employ square law devices, the acquisition time is approximately the same and has been confirmed by simulation to be about 1500 bit times. The time of acquisition of the present invention is shown to be reduced from approximately 1500 to 50 bit times which is an improvement of 30 to 1.

Figure 6:
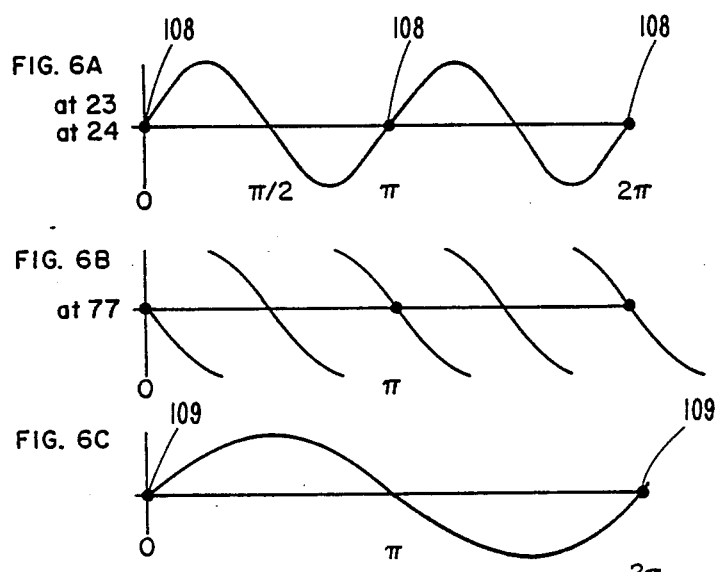
FIGS. 6A to 6C are waveforms showing the error signal in FIGS. 1 to 4 further illustrating the reduction and acquisition time.

Refer now to FIGS. 6A to 6B showing the waveforms of error signals produced in the FIGS. 1 to 4 embodiments. FIG. 6A shows a sinusoidal error signal of a beat note signal which appears at line 23 of FIG. 1 and at line 41 of FIG. 2. Contrasted thereto, when the switch 75 is closed in FIGS. 3 and 4, the voltage error beat note signal being produced on line 77 is shown in FIG. 6B as a chopped beat note signal having the same frequency as the voltage error signal in FIG. 6A. However, it will be noted that this is after the switch 75 is closed. The waveform shown in FIG. 6C is the beat note voltage error signal which occurs at line 77 when switch 75 is open during acquisition. Acquisition is achieved by tracking a signal with the original doppler shift error which has not been multiplied to increase the doppler shift error.

FIG. 6A has 3 stable lock points 108 at which time lock on can occur. Note that the stable lock points in FIG. 6A occur at $\pi$ and $2\pi$ which means that lock on can occur at the wrong phase of the data. This also explains why the differential encoding is necessary in FIGS. 1 and 2 to assure that the phase of the data during lock on occurs properly. In FIGS. 3 and 4 lock on does not occur with switch 75 open thus only FIG. 6C is applicable. The stable lock points 109 only occur at zero and $2\pi$ which means that the lock detector 64 cannot lock on the wrong phase of the data. The FIG. 3 and FIG. 4 embodiments are thus capable of locking on to BPSK signals that are not differentially encoded but are also capable of receiving and decoding differential encoded BPSK signals.

Having explained a preferred embodiment variable data rate receiver and a programmable variable data rate receiver it will be understood that the receivers are not only useful for receiving and decoding BPSK at varying data rates but that the acquisition time for locking on to an incoming data stream has been improved by a factor of approximately 30 to 1 over the prior art embodiments. Further, the present embodiment variable data rate receivers may be used for a fixed data rate when a high frequency receiver is employed.

A typical preferred application of the present invention is to employ the receivers in a satellite which is collecting weather data from a plurality of ground stations located along the path of the satellite flying over the continental United States. As each ground station is approached a satellite signal triggers the transmission of the collected data in a burst mode to the satellite where it is collected and assimilated until it flies over a ground receiving station used as a central collecting station. At this point the satellite receiver transmits in a burst mode to the preferred embodiment invention receiver a the ground station which immediately collects all of the weather station data over a large portion of the continental United States before transmission to large scale computers for assimilation in predicting weather patterns.

Some of the ground stations are located in environments in which transmission of data can be enhanced by employing preferred different data rates of transmission. Whenever it is advantageous to transmit at a higher or lower data rate the receiver may be remotely programmed to receive at the desired data rate without further redesign or hardware modification. Thus, a desirable feature of the present invention is that the acquisition or lock on time is a function of bit time and is actually accomplished faster in real time at higher data rates.

What is claimed is:

1. A variable rate receiver for receiving phase shift key (PSK) data signals as an input data stream and producing drift free real time in-phase data signals at the output comprising:
   a tracking loop of the type including a voltage controlled oscillator coupled to said input data stream for producing a signal at the frequency of the carrier,
   a data detection loop coupled to said input data stream for producing real time data output signals,
   a comparator coupled to said data detection loop for detecting data transactions,
   electronic switch means coupled between said comparator and said tracking loop,
   phase lock detection means coupled to said electronic switch means and to said tracking loop and to said data detection loop for detecting when the voltage error signals in said tracking loop and in said data detection loop have reached a predetermined voltage difference indicating that the tracking loop is locked on to the phase and frequency of the carrier of the input data stream, and
   said phase lock detection means having means for closing said electronic switch means.

2. A variable rate receiver as set forth in claim 1 which further includes a high-speed multiplier in said phase locked loop coupled to said electronic switch.

3. A variable rate receiver as set forth in claim 1 wherein said phase locked loop comprises a high-speed multiplier coupled to the input of a loop filter, and
   the output of said loop filter being coupled to the voltage controlled oscillator of said tracking loop.

4. A variable rate receiver as set forth, in claim 3 wherein said electronic switch is connected between said high-speed multiplier and said comparator.

5. A variable rate receiver as set forth in claim 1 which further includes an amplifier in said input data stream.

6. A variable rate receiver as set forth in claim 1 wherein said input data stream comprises a data free portion of carrier signal having a length in bits predetermined to be sufficient to cause said phase lock detection means to close said electronic switch means.

7. A variable rate received as set forth in claim 6 wherein said input data stream is provided with periodic data free portions of carrier signals for resynchronizing the phase of said incoming signals.

8. A variable rate receiver as set forth in claim 1 wherein said tracking loop and said data detection loop each comprise low pass filter means,
   a bit synchronizer, and
   means for changing the frequency of said low pass filters and for varying the frequency of said bit synchronizer in said data detection loop.

9. A variable rate receiver as set forth in claim 8 wherein said means for changing the frequency of said low pass filters comprises a processor controller coupled to programmable resistor packs in said low pass filters.

10. A variable rate receiver as set forth in claim 9 which further includes a programmable clock coupled to said processor controller.

11. A variable rate receiver as set forth in claim 1 which further includes a bit synchronizer in said data detection loop comprising an early-late gate circuit.

12. A variable rate receiver as set forth in claim 11 wherein such early-late gate circuit comprises sample and hold circuits and absolute value detectors.

13. A variable rate receiver as set forth in claim 12 which further includes a differential amplifier coupled to the output of said absolute value detectors.

14. A variable rate receiver as set forth in claim 13 which further includes delay circuit means coupled to the output of said programmable clock and to said sample and hold circuits.

15. A variable rate receiver as set forth in claim 9 wherein said programmable clock comprises a digital synthesizer clock coupled to said processor controller.

16. A method of decreasing the acquisition time in a variable data rate receiver which employs a phase lock loop circuit having a data detection loop and a tracking loop, comprising the steps of:

isolating said data detection loop from said tracking loop at the input to the tracking loop,
providing an electronic switch at the input of said tracking loop,
detecting the difference between the error voltage signal in said data detection loop and said tracking loop,
closing said electronic switch between said data detection loop and said tracking loop to reconnect as an operable circuit the phase lock loop when the error voltage signal difference indicates that the tracking loop is locked on to the carrier signal.

17. A method as set forth in claim 16 which further includes providing a burst of carrier tone signals as a preamble to the data stream input to said phase lock loop to further enhance the speed of acquisition of said carrier tone signal.

* * * * *